United States Patent
Takala et al.

(10) Patent No.: US 6,939,424 B1
(45) Date of Patent: Sep. 6, 2005

(54) METHOD OF MAKING A SPIRALLY-WOUND TUBE

(75) Inventors: Seppo Takala, Belchatow (PL); Marek Warcholinski, Belchatow (PL)

(73) Assignee: Oy KWH Pipe AB, (FI)

( * ) Notice: Subject to any disclaimer, the term of this patent is extended or adjusted under 35 U.S.C. 154(b) by 383 days.

(21) Appl. No.: 10/129,388

(22) PCT Filed: Oct. 27, 2000

(86) PCT No.: PCT/FI00/00936

§ 371 (c)(1),
(2), (4) Date: Aug. 1, 2002

(87) PCT Pub. No.: WO01/32401

PCT Pub. Date: May 10, 2001

(30) Foreign Application Priority Data

Nov. 3, 1999 (FI) .................................. 19992373

(51) Int. Cl.[7] .............................................. B65B 81/00
(52) U.S. Cl. ...................... 156/191; 156/192; 156/195; 156/244.13; 156/425; 156/429
(58) Field of Search ................................ 156/173, 175, 156/169, 191, 192, 194, 195, 244.13, 425, 156/429

(56) References Cited

U.S. PATENT DOCUMENTS

| | | | |
|---|---|---|---|
| 3,917,500 A | 11/1975 | Petzetakis et al. | |
| 4,033,808 A * | 7/1977 | Petzetakis | ................... 156/425 |
| 4,575,400 A * | 3/1986 | Ueda et al. | ................... 156/428 |
| 5,127,442 A * | 7/1992 | Blomqvist | ................... 138/154 |
| 5,261,988 A | 11/1993 | Dikis et al. | |
| 5,591,292 A * | 1/1997 | Blomqvist | ............. 156/244.13 |
| 6,105,649 A * | 8/2000 | Levingston et al. | ........ 156/425 |
| 6,209,607 B1 * | 4/2001 | Foos | ......................... 156/428 |

FOREIGN PATENT DOCUMENTS

| | | |
|---|---|---|
| JP | 8192472 | 7/1996 |
| WO | WO 93/22126 | 11/1993 |

* cited by examiner

Primary Examiner—Jeff H. Aftergut
(74) Attorney, Agent, or Firm—Connolly, Bove, Lodge & Hutz LLP

(57) ABSTRACT

This invention concerns a method and an apparatus for making a spirally-wound tube from a hollow thermoplastic profile (1) having a substantially rectangular cross-section, which method comprises the steps of: winding the thermoplastic profile (1) around a drum (2) and joining adjacent loops together by welding, and smoothing the outer weld joint (13) by means of extra heat and a smoothing body resting against the weld joint (13). The invention is characterized in that the thermoplastic profile (1), when fed to the drum (2), comes onto a stationary first section (3) comprising spaced sliding means (5) arranged along the periphery, on which section welding is performed, after which an inner weld joint (11) thus formed is arranged to run along a spiral groove (14) running around the stationary first section (3), whereby the inner weld joint (11), as well as the outer weld joint (13), are treated by using extra heat and a stationary smoothing body (10) resting against it, and that the tube, once both of the welded surfaces (11, 13) have been smoothed, is transferred to a rotary driven drum section (4) causing the tube to rotate and generating the winding motion of the thermoplastic profile (1).

17 Claims, 3 Drawing Sheets

METHOD OF MAKING A SPIRALLY-WOUND TUBE

BACKGROUND

This invention concerns a method of making a spirally-wound tube from a hollow thermoplastic profile having a substantially rectangular cross-section, which method comprises the steps of: winding the thermoplastic profile around a drum, joining adjacent loops together by welding, smoothing the outer weld joint by means of extra heat and a smoothing body resting against the weld joint, and feeding the tube axially forward by means of freely rotating, radial press rolls influencing the thermoplastic profile during the first winding around the drum.

The invention also concerns an apparatus for carrying out the above-described method, wherein the apparatus comprises: a cylindrical drum around which a thermoplastic profile is to be wound; radially oriented, freely rotating press rolls arranged along a periphery of the drum at an incoming end thereof; welding means for joining adjacent loops of the thermoplastic profile together; and heating and smoothing means for a weld joint formed on the outside of the tube.

Until now, this method has been carried out by means of a drum rotating along its entire length around which the thermoplastic profile is wound and on which the welding is performed. The weld joint on the outer surface of the tube is smoothed when the tube lies against the drum. This is done by supplying extra heat and allowing a stationary smoothing body to lie against and slide along the heated weld joint thereafter, during the rotary motion of the tube. The weld joint inside the tube has been formed against the rotating drum. A similar method is known, for example, from Patent Specification FI95219.

In order to make sure that the material in the weld joint is hot/molten enough and that there is no risk of a so-called cold joint, the welding burr on both the outer and the inner surface of the tube has to be of optimum size. A customary welding drum makes it somewhat more difficult to control the size of the inner welding burr, and at the same time, there is a small risk that the surface of the inner weld joint is affected by the axial sliding of the tube along the drum as long as the plastic material is molten.

BRIEF SUMMARY

The object of the present invention is to solve these problems, which has been achieved by means of a method that is characterized in that the thermoplastic profile, when fed to the drum, comes onto a stationary first section comprising spaced sliding means arranged along the periphery, on which section welding is performed, after which the inner weld joint thus formed is arranged to run along a spiral groove running around the stationary section, whereby the inner weld joint, as well as the outer weld joint, is smoothed by means of extra heat and a stationary body lying against the weld joint, and, once both of the welded surfaces have been smoothed, the tube is transferred to a rotary driven drum section causing the tube to rotate and generating the winding motion of the thermoplastic profile.

The apparatus for making a spirally wound tube from a hollow thermoplastic profile according to the invention includes a drum around which the thermoplastic profile is to be wound, wherein the drum comprises: a stationary first section having sliding means for the thermoplastic profile distributed over a periphery of the drum and having heating and smoothing means for an inner weld joint of the spirally wound tube, wherein a spiral groove is provided around the first section for a newly made inner weld joint on the tube; and a rotary driven cylindrical second section for giving the tube and consequently the thermoplastic profile energy needed for movement.

The advantage of the method and apparatus according to the invention is, that the inner weld joint does not come into contact with the drum at all, until the joint surface has been smoothed and the plastic has hardened. The invention results in a very even outer and inner joint surface.

The other characteristics of the invention are set forth in the dependent claims.

BRIEF DESCRIPTION OF THE DRAWINGS

In the following, the invention will be described in more detail with reference to the drawing wherein.

DETAILED DESCRIPTION

Figure 1:
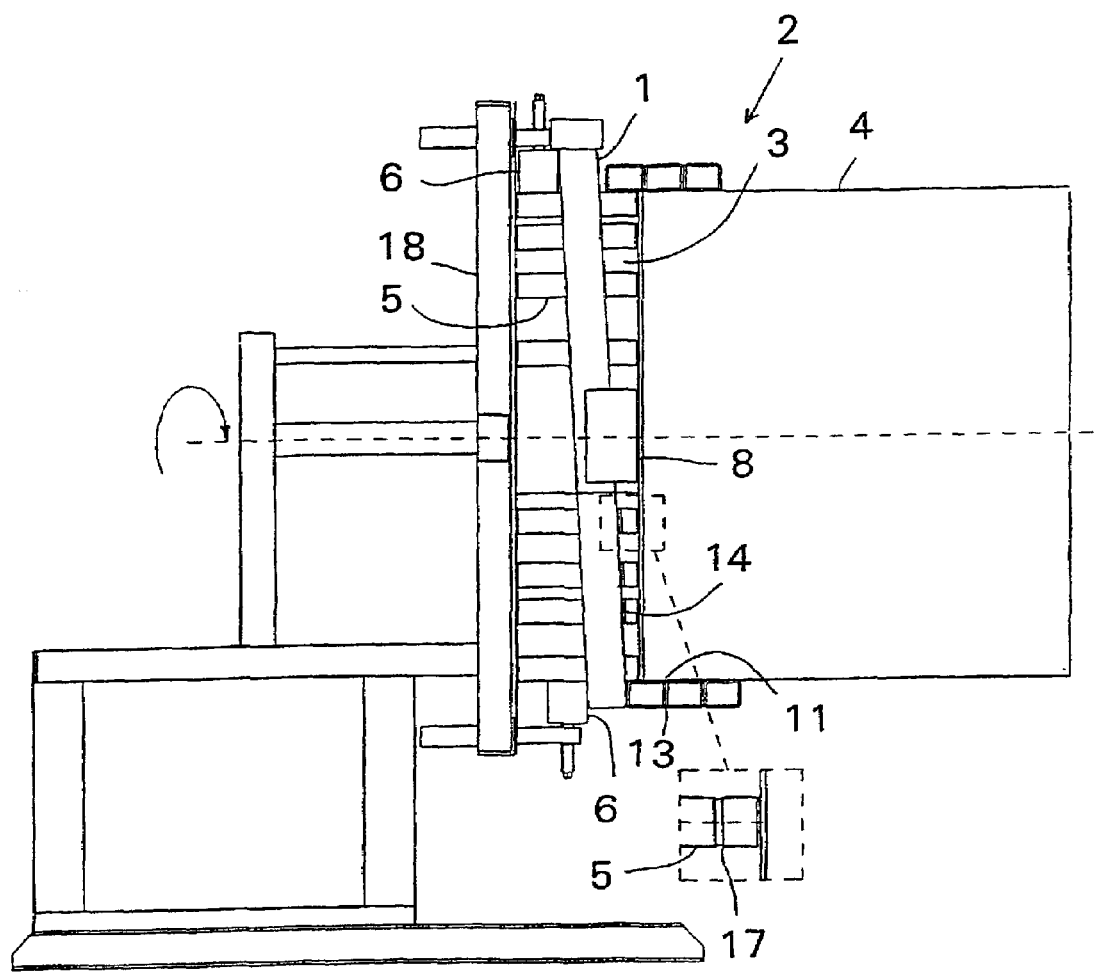
FIG. 1 is a side view of an embodiment of the apparatus according to the invention, giving the basic details thereof.
Figure 2:
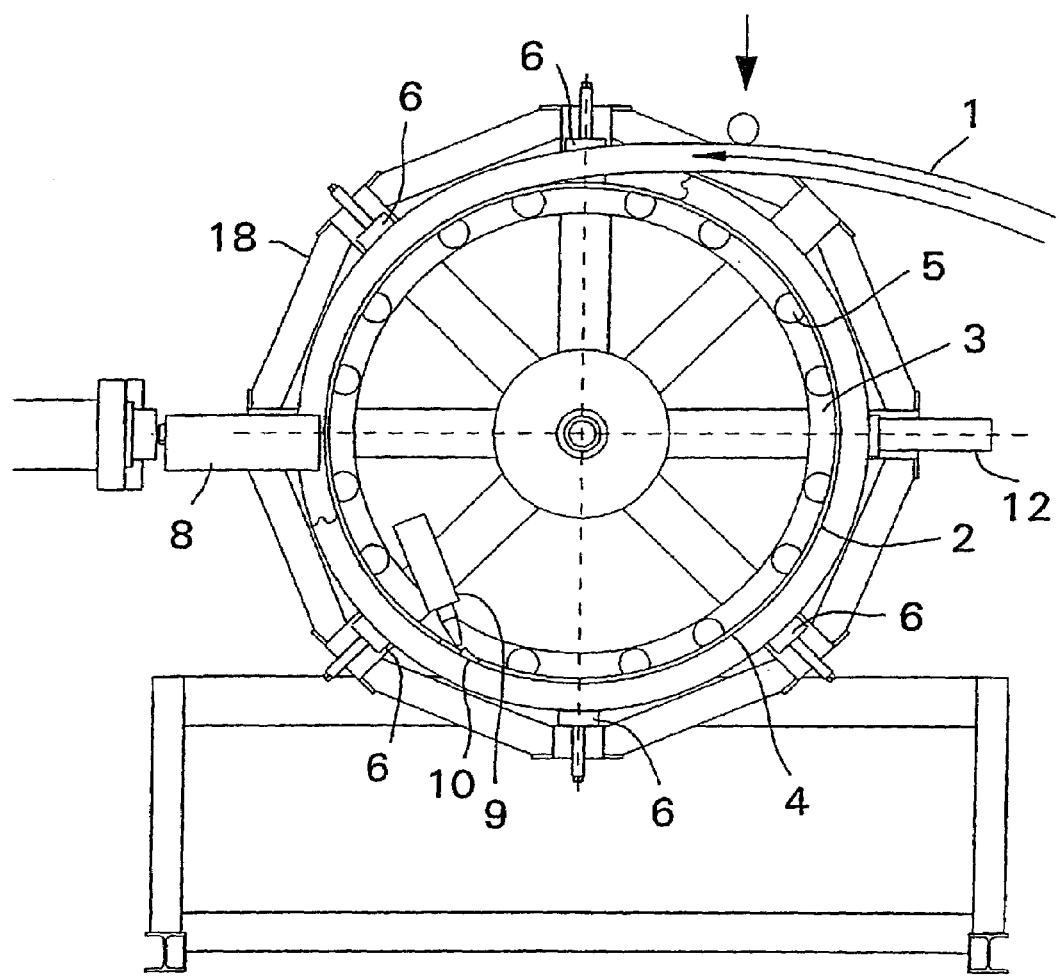
FIG. 2 shows the apparatus shown in FIG. 1 seen from the right.

According to the invention, a spirally-wound tube is made by feeding an extruded, hollow thermoplastic profile 1, having a substantially rectangular cross-section, to an apparatus comprising a cylindrical drum 2, having an outer diameter corresponding to a desired inner diameter of the tube to be made. The thermoplastic profile 1 is wound spirally around the drum 2, which, according to the invention, is divided into a stationary first section 3, where adjacent loops are welded together and where both of the surfaces of the formed weld joint are treated, and into a rotary driven, cylindrical second section 4, which is arranged to cause the tube made from the thermoplastic profile 1 to rotate and then simultaneously to pull the thermoplastic profile 1 around the stationary section 3 of the drum 2. During the welding, the plastic material is heated/melted in the welding zone by hot air, IR, halogen lamps or similar local heating, for example.

The stationary first section 3 comprises spaced sliding means 5 arranged along the periphery to facilitate the movement of the thermoplastic profile 1 over said section 3. By means of a number of freely rotating, radial press rolls 6, arranged along the periphery of the stationary section 3, at the incoming end of said section, an axial compression of adjacent loops of the thermoplastic profile 1 is achieved, and simultaneously the tube thus formed is pushed axially away from the drum. This pushing force is generated by continuously supplying the drum with new thermoplastic profile and thus forcing previously supplied loops away. When the thermoplastic profile 1 has been brought onto the stationary section 3 of the drum 2, it arrives to a welding station 8 where the thermoplastic profile 1 is joined to the nearest previous loop. The welding station 8 comprises either a welding keel producing an inner weld joint 11 and an outer weld joint 13 at the same time or two separate welding means. After the welding station 8, the thermoplastic profile 1 is transferred to a station provided with heating aid smoothing means 12 for the outer weld joint 13 on the tube. The thermoplastic profile 1 runs about three times around the drum 2 before it has left the stationary section 3 thereof completely. All the stations 8, 9, 10, 12 mentioned above are placed one after another along the periphery of the stationary first section 3.

In order to prevent the inner weld joint 11 from damaging during the sliding motion of the thermoplastic profile 1 along the stationary first section 3, while the plastic material of the weld joint is still in the plastic state, a groove 14 runs spirally around the stationary section 3, following the route along which the inner weld joint 11 moves during the rotation of the tube.

In the embodiment shown in FIG. 1, the stationary first section 3 consists of a number of axially oriented and freely rotating sliding rolls 5 arranged along the periphery of the drum 2 and extending along the entire length of the stationary first section 3. In this case, the spiral groove 14 intended for the inner weld joint 11 of the tube to be made is an annular groove 14 made in the periphery of each sliding roll 5. The annular grooves 14 in the sliding rolls 5 are axially spaced with respect to each other in such a way that they form a spiral groove around the first section 3, having a pitch corresponding to the pitch of the inner weld joint 11 of the tube to be made.

Figure 3:
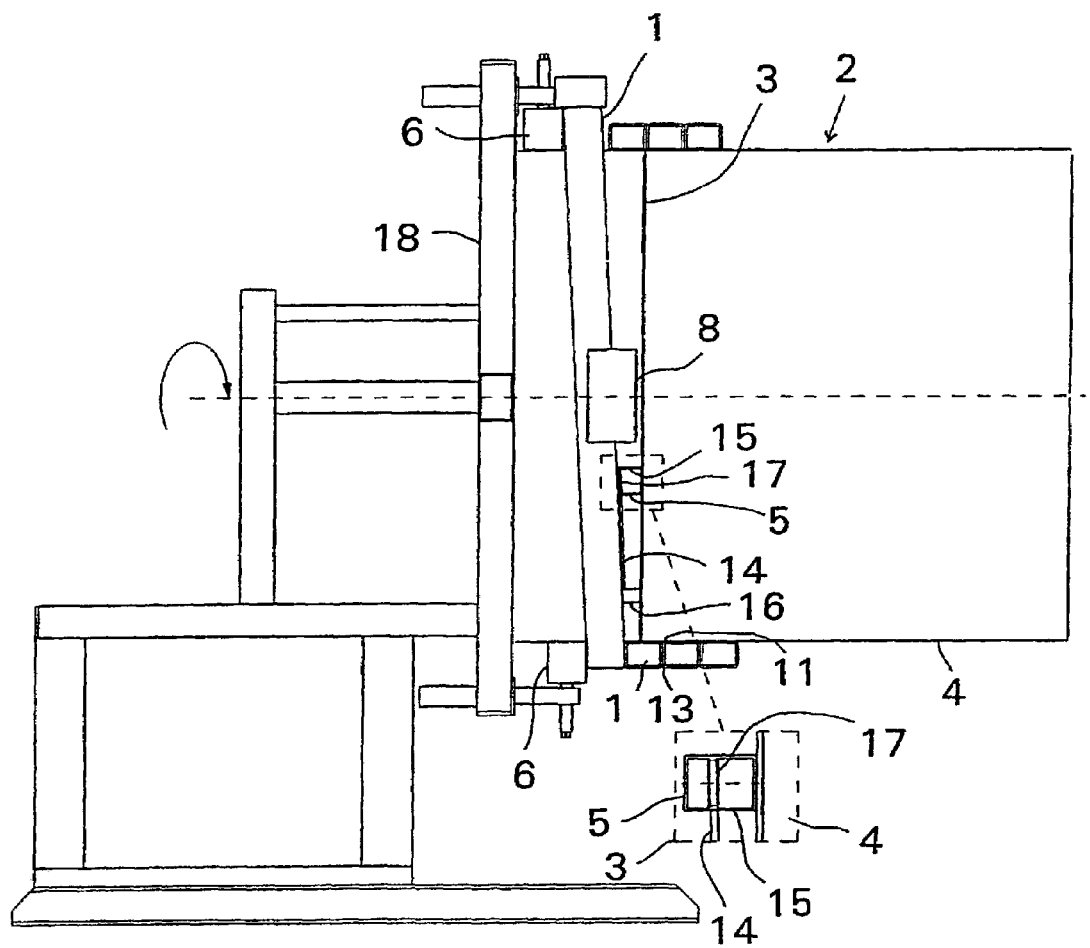
FIG. 3 is a side view of another embodiment of the apparatus according to the invention.

In the embodiment shown in FIG. 3, the stationary first section 3 comprises a steel shell provided with openings 15 for the sliding means 5 of the section along the periphery of the section and an opening 16 for the heating and smoothing means 9, 10 intended for the inner weld joint 11 inside the tube being made. The sliding means 5 can be either axially oriented rolls having a peripheral annular groove 17 that coincides with the spiral groove 14 in the steel shell.

According to another embodiment, the sliding means 5 are sliding plates made of polytetrafluoroethylene or the like. Each slide plate 5 comprises a groove 17 coinciding with the spiral groove 14 in the steel shell.

The welding station 8, the station 9, 10 comprising heating and smoothing means for the inner weld joint 11 and the station 12 comprising corresponding heating and smoothing means for the outer weld joint 13 are arranged spirally one after another along the periphery of the stationary first section 3.

Preferably, the heating and smoothing means 9, 10; 12 are a hot-air blower accompanied by a sole of polytetrafluoroethylene or of another suitable material, which sole is arranged to rest against the heated weld joint 11, 13 of the tube being made. The heating means can also be low-effect lasers, IR heaters or catalytic burners.

The apparatus according to the invention has the further advantage that the stationary first section 3 and the frame 18 comprising the radial press rolls 6 form a replaceable part of the apparatus, thus making it easier to go over from one tube dimension to another. Thus, a pre-set unit can be provided for each tube dimension that, once it has been mounted, only requires some minor fine adjustment of the press rolls. When an arrangement of this kind is used, the standing times for changing tube dimensions will be considerably reduced.

What is claimed is:

1. A method for making a spirally-wound tube from a hollow thermoplastic profile having a substantially rectangular cross-section, wherein the method comprises:
   feeding the thermoplastic profile to a drum such that the thermoplastic profile comes onto a stationary section of the drum, wherein a spaced sliding means is arranged along a periphery of the stationary section;
   winding the thermoplastic profile around the drum;
   welding adjacent loops of the thermoplastic profile together on the stationary section so as to form the spirally-wound tube, wherein an inner weld joint and an outer weld joint are formed by the welding of adjacent loops, and wherein the inner weld joint and the outer weld joint are arranged to run along a spiral groove running around the stationary section;
   smoothing the inner weld joint by using extra heat and a stationary body resting against the inner weld joint;
   smoothing the outer weld joint by using extra heat and a stationary body resting against the outer weld joint;
   transferring the tube to a rotary driven section which causes the tube to rotate and pulls the thermoplastic profile around the stationary section; and
   feeding the spirally-wound tube axially forward by means of freely rotating, radial press rolls influencing the thermoplastic profile during an initial winding around the drum.

2. The method of claim 1, wherein the welding is performed by means of a welding keel that enables simultaneous welding of the outer weld joint and the inner weld joint.

3. The method claim 1, wherein the outer weld joint and the inner weld joint are formed by separate welding means.

4. An apparatus for making a spirally wound tube from a hollow thermoplastic profile having a substantially rectangular cross-section, the apparatus comprising;
   a cylindrical drum around which the thermoplastic profile is to be wound;
   radially oriented, freely rotating press rolls arranged along a periphery of the cylindrical drum at an incoming end of the cylindrical drum;
   welding means for joining adjacent loops of the thermoplastic profile together; and
   heating and smoothing means for a weld joint formed on the outside of the tube;
      wherein the drum is divided into a stationary section and a rotary driven cylindrical section;
      wherein the stationary section comprises a sliding means for the thermoplastic profile distributed over a periphery of the stationary section;
      wherein the stationary section comprises heating and smoothing means for a weld joint formed inside the tube;
      wherein a spiral groove is disposed around the stationary section for a newly made inner weld joint on the tube; and
      wherein the rotary driven cylindrical section is arranged to provide the tube and the thermoplastic profile energy needed for movement.

5. The apparatus of claim 4, wherein the sliding means comprises a number of axially oriented, freely rotating sliding rolls with a length corresponding to a length of the stationary section, and wherein the spiral groove is an annular groove made in each sliding roll, which annular grooves are mutually axially spaced forming a spiral.

6. The apparatus of claim 5, wherein the stationary section and the frame with the radial press rolls form a replaceable unit of the apparatus.

7. The apparatus of claim 4, wherein the stationary first section comprises a steel shell having openings for the sliding means and for the heating and smoothing means for the weld joint inside the tube, and wherein the spirally running groove for a newly made inner weld joint is made in the steel shell and in the sliding means of the section.

8. The apparatus of claim 7, wherein the stationary section and the frame with the radial press rolls form a replaceable unit of the apparatus.

9. The apparatus of claim 7, wherein the sliding means is an axially oriented roll having a peripheral annular groove that coincides with the spiral groove in the steel shell.

10. The apparatus of claim 9, wherein the stationary section and the frame with the radial press rolls form a replaceable unit of the apparatus.

11. The apparatus of claim 7, wherein the sliding means is a polytetrafluoroetylene slide plate into which a groove coinciding with the spiral groove in the steel shell is formed.

12. The apparatus of claim 11, wherein the stationary section and the frame with the radial press rolls form a replaceable unit of the apparatus.

13. The apparatus of claim 4, wherein the welding means, the heating and smoothing means for the inner weld joint and the heating and smoothing means for the outer weld joint are arranged spirally one after another along the periphery of the stationary section.

14. The apparatus of claim 13, wherein the stationary section and the frame with the radial press rolls form a replaceable unit of the apparatus.

15. The apparatus of claim 13, wherein the heating and smoothing means for the inner weld joint comprises a hot-air blower accompanied by a sole of polytetrafluoroethylene that is arranged to rest against the inner weld joint and the heating and smoothing means for the outer weld joint comprises a hot-air blower accompanied by a sole of polytetrafluoroetlhylene that is arranged to rest against the outer weld joint.

16. The apparatus of claim 15, wherein the stationary section and the frame with the radial press rolls form a replaceable unit of the apparatus.

17. The apparatus of claim 4, wherein the stationary section and the frame with the radial press rolls form a replaceable unit of the apparatus.

* * * * *